United States Patent
Edison et al.

(10) Patent No.: US 7,392,203 B2
(45) Date of Patent: Jun. 24, 2008

(54) VENDOR SECURITY MANAGEMENT SYSTEM

(75) Inventors: John Michael Edison, North Potomac, MD (US); Robert Lee Kelly, II, New Windsor, MD (US)

(73) Assignee: Fortrex Technologies, Inc., Frederick, MD (US)

( * ) Notice: Subject to any disclaimer, the term of this patent is extended or adjusted under 35 U.S.C. 154(b) by 829 days.

(21) Appl. No.: 10/621,408

(22) Filed: Jul. 18, 2003

(65) Prior Publication Data

US 2005/0015620 A1     Jan. 20, 2005

(51) Int. Cl.
G06F 9/44       (2006.01)
G06F 17/50      (2006.01)

(52) U.S. Cl. .......................................................... 705/7
(58) Field of Classification Search ...................... 705/74
See application file for complete search history.

(56) References Cited

U.S. PATENT DOCUMENTS 6,941,313 B2 *  9/2005  Seliger et al. ............... 707/101
2002/0107875 A1 *  8/2002  Seliger et al. ............... 707/200
2002/0138417 A1 *  9/2002  Lawrence ..................... 705/38
2002/0178046 A1 * 11/2002  Lawrence ..................... 705/10
2003/0004754 A1 *  1/2003  Krutz ............................ 705/2
2003/0069983 A1 *  4/2003  Mukund ...................... 709/229
2003/0149578 A1 *  8/2003  Wong ........................... 705/1
2003/0236742 A1 * 12/2003  Lawrence ..................... 705/38
2004/0024693 A1 *  2/2004  Lawrence ..................... 705/38
2004/0128186 A1 *  7/2004  Breslin et al. ................ 705/10
2004/0193907 A1 *  9/2004  Patanella ..................... 713/200
2004/0193918 A1 *  9/2004  Green et al. ................. 713/201
2005/0165790 A1 *  7/2005  Seliger et al. ................ 707/10

* cited by examiner

Primary Examiner—Christian LaForgia
(74) Attorney, Agent, or Firm—Novak Druce + Quigg LLP

(57) ABSTRACT

A management system for determining the security measures of a plurality of vendors. An assessment is performed on a plurality of vendors at a discount. The assessment is placed into a database and is reviewable and accessible by clients who subscribe to the management system. The management system allows clients to review and assess the security information regarding a plurality of vendors without the cost of performing an assessment of each vendor.

8 Claims, 1 Drawing Sheet

VENDOR SECURITY MANAGEMENT SYSTEM

FIELD OF THE INVENTION

This invention relates to a method of providing a database of security information for a plurality of vendors from which a client can review and select a vendor having such security measures necessary to protect certain information the client desires to keep confidential.

BACKGROUND OF THE INVENTION

Since the proliferation of the internet, organizations have been migrating to outsourced services as a means of cost reduction. The migration has created a large industry. It has also created a large internet technology (IT) security problem. For example, the recent passage of the Gramm-Leach-Bliley Act (GBLA) requires financial institutions to verify that their vendors maintain the appropriate level of IT security. The recent HIPAA regulations place similar requirements on the healthcare industry. Other industry segments are also adopting similar requirements for various standards.

Early in this process, security consisted primarily of password and physical access control. As businesses migrate toward the internet to provide connection between organizations and their outsourced service providers, the attention to IT security is growing rapidly in both scope and level of detail. Therefore, the requirement to verify the IT security of the outsourced service providers has also increased.

For example, financial institutions contract out a variety of services, such as loan processing, credit card processing, home equity services, line of credit services, etc. to outside service providers. However, in carrying out these services for the financial institutions, the outside service providers will necessarily have access and control over non-public information, such as the card holders' home addresses, bank account information, credit card information, investment holdings, etc. This non-public information is the focus of stringent security measures, which are designed to prevent unauthorized persons from having or gaining access to this information.

In response to the threat to this information, rules, regulations and procedures have been designed to ensure its protection. For example, virtually all financial institution regulations and major policies are developed and issued on an interagency basis under the direction of the Federal Financial Institutions Examination Council (FFIEC). The FFIEC is made of the Federal Reserve Board, Federal Deposit Insurance Corporation, Office of the Comptroller of the Currency, Office of Thrift Supervision and the National Credit Union Administration. The FFIEC has recently updated the IT security section of the IT Examiner's Handbook, the guideline for all financial institutions examinations. The guidelines have a wider and more technical scope than the previous version released in 1996. This, combined with the GBLA requirements, is placing an increased burden on financial institutions and their vendors regarding auditing and compliance.

Historically, outsourced service providers have been utilizing an SAS70 audit as their main source of proof that their handling of client information is appropriate for the level of security required. An SAS70 is the authoritative guidance that allows service organizations to disclose their control activities and processes to their customers and their customers' auditors in a uniform reporting format. An SAS70 examination signifies that a service organization has had its control objectives and control activities examined by an independent accounting and auditing finn. A formal report including the auditor's opinion ("Service Auditor's Report") is issued to the service organization at the conclusion of an SAS70 examination. The SAS70 was not designed as an assessment of IT security best practices. In addition, with the advent of the fast paced internet and increase in security breeches with quickly changing breeching techniques, the SAS70 is not adequate to provide the required level of information as quickly as the security procedures change.

Research shows that both clients and their outsourced service providers will incur greater costs as a result of this IT security focus. Considering that each client may have many outsourced service providers, additional requirements for manpower and financial resources to track, collect and verify the outsourced service provider's IT security information will increase overhead costs. From the outsourced service providers perspective there are cost increases as well. Larger outsourced service providers may have thousands of clients. Because each client is requesting IT security information, the outsourced service providers will be inundated with requests and burdens of proof. Because of these issues, overhead cost increases will be passed onto the end users.

SUMMARY OF THE INVENTION

It is thus an object of this invention to overcome the above mentioned and other problems known to those having skill in the art by using a vendor security management system (VSMS) according to this invention. The system enables entities to satisfy the requirements of security verification in a structured and cost controlled environment.

The VSMS is initially established by creating a database of vendors and their security information. This information relates to vendor contract agreements, SAS70 reports, Penetration Reports, Information Security Policies, Computer Incident Response Policies, DR Plans, Business Resumption Plans, Insurance Coverages, $3^{rd}$ Party Vendor Management Policies & Programs and/or Annual Financial Reports, as well as other pertinent information. Vendors can provide updated information as improvements to their security posture are implemented and verified. Once the security information and any subsequent improvements are verified, they are added to a database referred to as the vendor knowledge system (VKS), which is established in the VSMS.

When a client is enrolled in the VSMS, the client can then utilize the system to define, document and implement their entire vendor management program and view IT security information as well as other pertinent information regarding a vendor that is contained in the VKS.

The vendors may also be given a rating depending on various factors. For example, if the information to which the vendor has access is high risk information of non-public information, such as an end user's address, bank account information, investment holding, etc., the vendor would be assessed as a high risk vendor, requiring high levels of securities. Each vendor could be assessed pursuant to the highest level of client information they possess.

If the information to which the vendor has access is low risk information, such as name, phone number, etc., the vendor would be assessed as a low risk vendor. The security procedures and structures required would be lessened in comparison to the high-risk information.

BRIEF DESCRIPTION OF THE DRAWING

The invention will be described in greater detail in what follows and in reference to a single drawing, in which FIG. 1 illustrates the structure of the VSMS system according to a preferred embodiment of the invention.

DETAILED DESCRIPTION OF THE INVENTION

Figure 1:
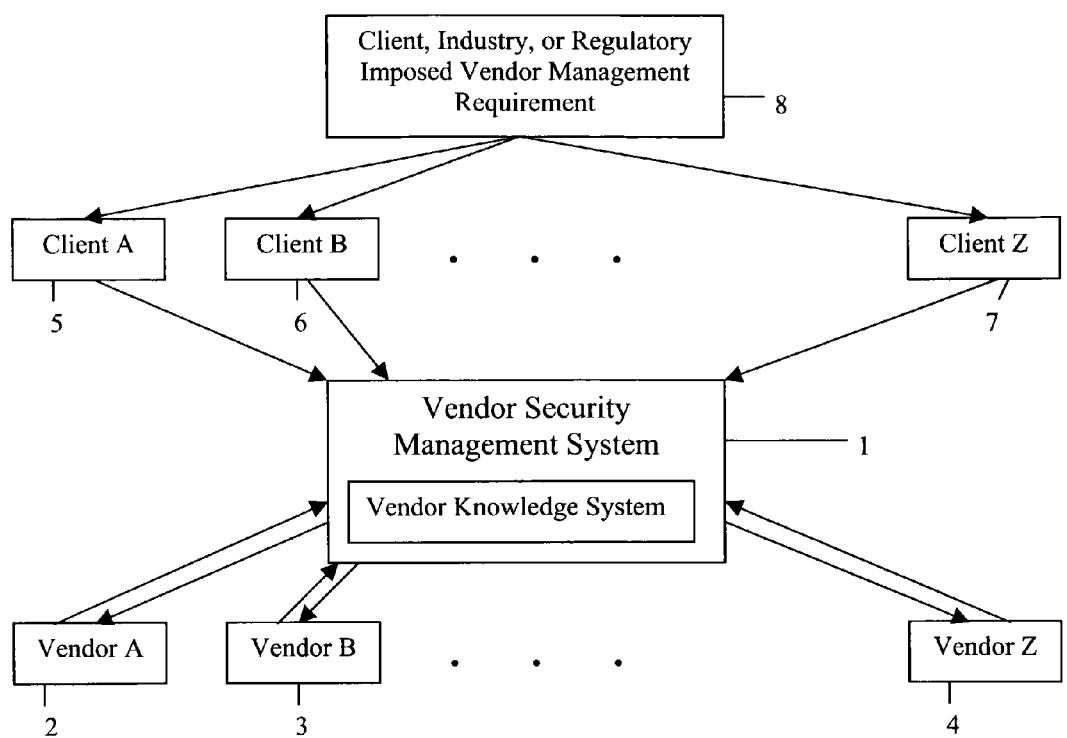

The main structure of the VSMS according to a preferred embodiment is illustrated in FIG. 1. The VSMS 1 is situated between a plurality of Clients 5, 6, and 7 and Vendors 2, 3 and 4. Clients 5, 6, and 7 have an obligation to protect certain non-public information that is transferred to the Vendors 2, 3 and 4 and is used to perform the services outsourced to them. The non-public information to be protected is determined by statute, regulation, or policy by one or more of the Clients themselves, the relative Industry and/or the appropriate Regulatory Body 8. When the Clients 5, 6 and 7 request security information regarding a particular Vendor, they either ask the Vendor directly, who will refer the request to the VSMS 1, or the Client, if a current subscriber, will direct the request to the VSMS 1. The VSMS 1 contains a database of the security information for all of the Vendors 2, 3 and 4 that have provided their security information to the VSMS. The clients can search the VSMS by one or more of vendor name, client business units, vendor products, security levels, or other parameters necessary to help identify potential vendors or obtain current information regarding one or more of their client vendors. When identifying a potential vendor, the client can then contact the vendor to engage in outsourcing its services with the knowledge that the non-public information will be protected according to the security level identified in the VKS.

The database used in the VSMS 1, the VKS 9 is created adding assessment and other pertinent information regarding a vendor to the VKS 9. Collection of this information can be initiated by either contacting vendors and offering the VSMS 1 services or by vendors contacting the VSMS 1 and requesting to be added. An assessment is then conducted to determine the level of security maintained by the vendor. The results of the assessment and any additional information provided by the vendor are then added to the database.

The security measures and information that are examined can range from simple password and access procedures to complex business policies involving insurance coverages and financial reports. For example, the security information can contain vendor contract agreements, SAS70 Reports, Penetration Reports, Information Security Policies, Computer Incident Response Policies, DR Plans, Business Resumption Plans, Insurance Coverages, 3$^{rd}$ Party Vendor Management Policies & Programs and Annual Financial Reports. Other information may be included which relates to the security measures used by the vendor to protect any non-public information.

The assessment is then scanned and/or transferred and stored in a database in the VKS 9 in the VSMS 1 along with the assessments of other vendors. The VKS 9 is updated periodically to provide accurate information regarding vendors and their current security status. Further, if a vendor updates its own system or makes any changes, the vendor can provide such updates or changes to keep the information stored in the VKS 9 current.

The VSMS provides vendors incentive to participate by its simplicity and low cost. Without the VSMS, vendors may have to perform several assessments of their security measures for a plurality of clients, each time a new client approaches the vendor, an expensive and repetitive process. With the VSMS, the vendors need only perform one assessment and provide updates on its security measures periodically. All clients can access the VSMS to review the assessment and updates for the vendor. As a further incentive to participate in the VSMS, the vendors are provided the assessment at a low cost or provided for free.

The clients have access to the VSMS by subscribing to the system. Subscription gives the client the ability to search within the VKS by any of a variety of methods, such as by vendor, keyword, security measures, vendor product type, and other methods that allow for the client to locate a vendor having the desired security measures for the particular non-public information to be protected. Such a system allows for the client to review current security procedures of its current vendors. The system also allows the client to review the security information regarding vendors with whom the client is considering a relationship. The assessments are viewable in multiple formats to simplify examination and comparison. Examples of formats are the FFIEC, ISO17799 and HIPAA guidelines; however, other formats may be used which provide the necessary information for the client to select a vendor.

The VSMS can be used in a variety of specific industry situations. In a preferred embodiment, the clients are financial institutions and the vendors are any of the many outsourced service providers to the financial industry. For example, in the course of a service provider processing a loan, the financial institution must necessarily disclose non-public information, such as a name, address, social security number, phone number, bank account information, etc. The person seeking the loan, as well as the financial institution, does not want such information to be disclosed to anyone other than those making the decision to approve the loan and those necessary to manage the loan, thus, they would desire a certain level of security over the information. Furthermore, such information is required to be protected by the government through statutes, regulations, and the industry itself sets up general guidelines to protect the information.

In another embodiment, the clients are businesses and the vendors are recruiting firms, personnel management firms, etc. or other outsourced service providers. The client as well as the employees or perspective employees would desire certain personal or confidential information regarding the employees, the prospective employees, or the client itself that must necessarily be disclosed between the clients and the vendors to be kept in confidence. In a further embodiment, the clients are healthcare providers and the vendors are bill collectors, insurance companies, hospitals, claims adjusters, etc. The relationships between these clients and vendors necessarily involve personal information of patients and the practices of the health care providers. The VSMS can be used effectively in various other situations where a client must pass information to a vendor that is to remain confidential. The above are disclosed merely as examples.

Although the present invention has been described and illustrated in detail regarding a specific example of a vendor security management system, such explanation is to be clearly understood that the same is by way of illustration and example only, and is not to be taken by way of limitation. Other modifications of the above example, which may be made by those having ordinary skill in the art, remain within the scope of the invention. Thus, the spirit and scope of the present invention should be defined only by the terms of the claims.

We claim:

1. In a transaction involving a disclosure of confidential information by first parties to second parties, requiring the second parties to have adopted security measures with respect to the handling of the information and periodically respond to requests of the first parties for assurances of the adoption, implementation and observance of the security measures by the second party, a method for providing such assurances to the first parties, comprising:

arranging by a third party with a selected number of the second parties to acquire, compile and store in a database of said third party, information regarding the adoption, implementation and observation of security measures for each of the selected number of second parties;

arranging by said third party with a selected number of the first parties subscription services providing the selected number of first parties with assurances of the security measures of the selected number of second parties upon request; and providing by said third party the assurances of the security measures of the selected number of second parties to the selected number of first parties upon request.

2. The method according to claim 1 further including updating the security measures information stored in the database of said third party for each second party periodically.

3. The method according to claim 1 further including updating the security measures information stored in the database of said third party upon a notification by a respective second party and verification by a third party.

4. The method according to claim 1 wherein the acquisition, compilation and storage of the security measures information of the selected number of second parties by said third party is performed at no cost to the selected number of second parties.

5. The method according to claim 1 including rendering the subscription services of said third party for a fee.

6. The method according to claim 1 further including providing by said third party a rating for each second party based upon a type of the confidential information and the security measures of said second party.

7. The method according to claim 1 further including providing a rating by said third party for each second party based upon the security measures of the second party.

8. A method of providing assurance to one of a number of first party entities that one of a number of second party entities to which said one first party entity contemplates the disclosure of certain confidential information, has adopted, implemented and observed certain security measures with respect tot the handling of confidential information, comprising:

arranging with at least one of said second party entities to acquire therefrom, compile and store in a database, by a third party entity, verification regarding the adoption, implementation and observation of security measures in the handling of confidential information of at least one of said first party entities;

arranging with at least one of said first party entities, a subscription service providing said one first party entity with assurance of the adoption, implementation and observance of the security measures of said one second party, by said third party, upon request, upon request of said one first party entity; and providing the requested assurances by said third party to said one first party in response to said request.

\* \* \* \* \*